United States Patent
Kim

(10) Patent No.: US 8,564,745 B2
(45) Date of Patent: Oct. 22, 2013

(54) LIQUID CRYSTAL DISPLAY HAVING MORE THAN ONE COLOR PORTION WITHIN A PIXEL

(75) Inventor: Dong-Gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 294 days.

(21) Appl. No.: 12/915,562

(22) Filed: Oct. 29, 2010

(65) Prior Publication Data

US 2011/0222004 A1 Sep. 15, 2011

(30) Foreign Application Priority Data

Mar. 10, 2010 (KR) .................. 10-2010-0021244

(51) Int. Cl.
*G02F 1/1335* (2006.01)
*G02F 1/1343* (2006.01)
*G02F 1/136* (2006.01)

(52) U.S. Cl.
USPC .............. 349/106; 349/48; 349/141; 349/144

(58) Field of Classification Search
USPC .................................. 349/141, 106, 144, 48
See application file for complete search history.

(56) References Cited

U.S. PATENT DOCUMENTS

| | | | |
|---|---|---|---|
| 6,177,973 B1* | 1/2001 | Lee et al. ...................... | 349/123 |
| 6,507,382 B1* | 1/2003 | Sakamoto et al. ............ | 349/141 |
| 7,206,042 B2 | 4/2007 | Yang et al. | |
| 7,339,642 B2 | 3/2008 | Iijima et al. | |
| 7,471,358 B2 | 12/2008 | Tago et al. | |
| 2002/0126238 A1* | 9/2002 | Matsushita et al. ........... | 349/106 |
| 2007/0236635 A1* | 10/2007 | Morimoto et al. ............ | 349/114 |
| 2007/0268433 A1* | 11/2007 | Moon et al. ................... | 349/114 |
| 2008/0124997 A1 | 5/2008 | Park et al. | |
| 2009/0207328 A1* | 8/2009 | Hur et al. ....................... | 349/37 |

FOREIGN PATENT DOCUMENTS

| | | |
|---|---|---|
| JP | 08-084347 A | 3/1996 |
| JP | 3723511 B2 | 9/2005 |
| JP | 2007-057994 A | 3/2007 |
| KR | 1020060036131 A | 4/2006 |
| KR | 100867483 B1 | 10/2008 |

* cited by examiner

*Primary Examiner* — Michael Caley
(74) *Attorney, Agent, or Firm* — Cantor Colburn LLP

(57) ABSTRACT

A liquid crystal display includes a first substrate and a second substrate facing each other, a plurality of a signal line on the first substrate, a pixel electrode including a first pixel electrode and a second pixel electrode connected to the signal lines and separated from each other, and a liquid crystal layer between the first substrate and the second substrate and including a liquid crystal molecule. A voltage charged to the liquid crystal layer in a first region occupied by the first sub-pixel electrode, is lower than a voltage charged to the liquid crystal layer in a second region occupied by the second sub-pixel electrode. The second region and a portion of the first region display a first color, and a remaining portion of the first region displays the second color.

31 Claims, 14 Drawing Sheets

LIQUID CRYSTAL DISPLAY HAVING MORE THAN ONE COLOR PORTION WITHIN A PIXEL

This application claims priority to Korean Patent Application No. 10-2010-0021244 filed on Mar. 10, 2010, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

A liquid crystal display is one of the most widely used flat panel displays. The liquid crystal display includes two display panels on which field generating electrodes such as a pixel electrode and a common electrode are disposed, and a liquid crystal layer that is disposed therebetween. The liquid crystal display shows images by applying voltage to the field generating electrodes to generate an electric field on the liquid crystal layer, determine alignment of liquid crystal molecules of the liquid crystal layer and control polarization of incident light.

In order to increase a display quality of the liquid crystal display, it is necessary to implement a liquid crystal display that has a high contrast ratio, an excellent light viewing angle, and a rapid response speed.

In addition, it is required to implement a liquid crystal display that has high transmittance. In order to increase the transmittance of the liquid crystal display, a method for implementing four pixels that has three primary colors such as red, green and blue colors, and a white color has been developed. However, in the case of when any one of three primary colors or the white color in the pixel area is displayed, a color reproducibility at a low grayscale may be lowered.

BRIEF SUMMARY OF THE INVENTION

The invention has been made in an effort to provide a liquid crystal display that can increase a color reproducibility at a low grayscale, and increase a luminance at a high grayscale.

An exemplary embodiment of a liquid crystal display includes a first substrate and a second substrate facing each other, a plurality of a signal line disposed on the first substrate, and a pixel electrode including a first pixel electrode and a second pixel electrode connected to the signal lines and separated from each other. The first pixel electrode and the second pixel electrode include a plurality of branched electrodes, and the branched electrodes of the first pixel electrode and the branched electrodes of the second pixel electrode are alternately disposed. The pixel electrode includes a first region in which an interval between adjacent branched electrode of the first pixel electrodes and branched electrodes of the second pixel electrode is a first distance, and a second region in which an interval between adjacent branched electrodes of the first pixel electrode and branched electrodes of the second pixel electrode is a second distance smaller than the first distance. The second region and a first portion of the first region display a first color, and second portion of the first region displays a second color.

The first color may be any one of primary colors, and the second color is white or yellow.

In the second region and a first portion of the first region that displays the first color, a color filter may be disposed, and in the second portion of the first region that displays the second color, the color filter may not be disposed.

The color filter may be disposed on the first substrate.

The color filter may be disposed between the signal lines and the pixel electrode, and in the second portion of the first region that displays the second color, a transparent organic insulator may be disposed.

The color filter may be disposed on the second substrate.

A planar area of the second portion of the first region that displays the second color may be 20% or less of a total planar area of the first pixel electrode and the second pixel electrode.

A planar area of the second portion of the first region that displays the second color may be one half or less of a planar area of the first portion of the first region that displays the first color.

The liquid crystal display may further include a liquid crystal layer between the first substrate and the second substrate. Long axes of the liquid crystal molecules of the liquid crystal layer may be perpendicular to planar surfaces of the first substrate and the second substrate, in a state in which there is no electric field.

The first region may further include a third region in which an interval between the adjacent branched electrodes of the first pixel electrode and branched electrodes of the second pixel electrode is a third distance larger than the first distance, and the second portion of the first region that displays the second color is the third region.

A planar area of the third region may be the same as or smaller than a planar area of the second region, and a planar area of the first portion of the first region in which the interval between branched electrodes of the first pixel electrode and branched electrodes of the second pixel electrode is the first distance, may be three times or more larger than the planar area of the third region.

Another exemplary embodiment of a liquid crystal display includes a first substrate and a second substrate facing each other, a plurality of a signal line on the first substrate, a pixel electrode that includes a first sub-pixel electrode and a second sub-pixel electrode connected to the signal lines and separated from each other, and a liquid crystal layer between the first substrate and the second substrate and including a liquid crystal molecule. A voltage charged to the liquid crystal layer in a first region including the first sub-pixel electrode, is lower than a voltage charged to the liquid crystal layer in a second region including the second sub-pixel electrode. The second region and a portion of the first region display a first color, and a remaining portion of the first region displays the second color.

A planar area of the remaining portion of the first region that displays the second color may be 20% or less of a total planar area of the first sub-pixel electrode and the second sub-pixel electrode.

A planar area of the remaining portion of the first region that displays the second color may be one half or less of the portion of the first region that displays the first color.

According to exemplary embodiments of the invention, while the transmittance of the liquid crystal display is not lowered and the resolution is not deteriorated, it is possible to maintain the color reproducibility at a high degree, and in particular, to increase the color reproducibility at a low grayscale and increase the luminance at a high grayscale.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1A:
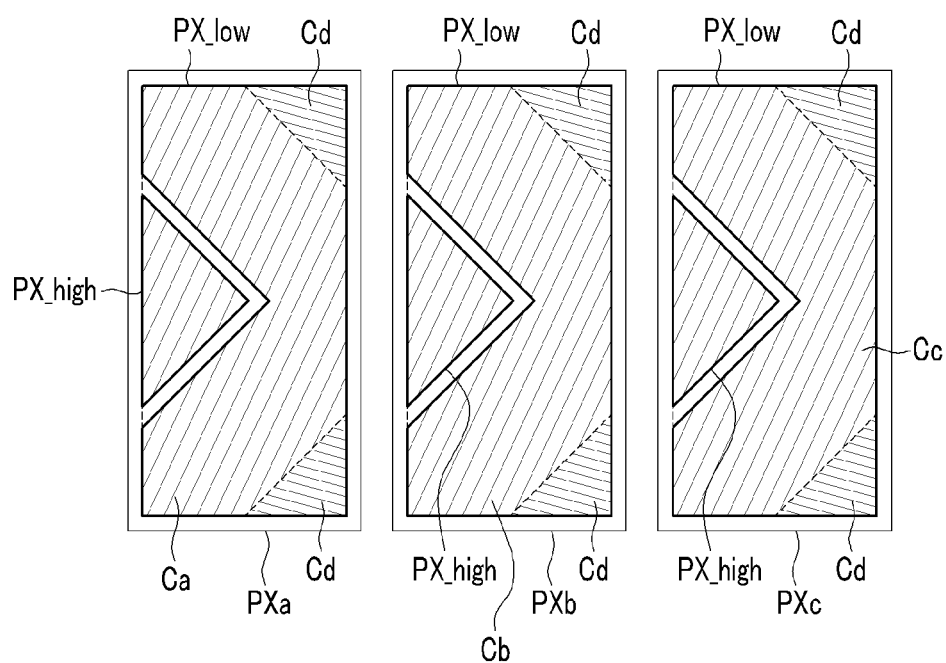
FIG. 1A, FIG. 1B, and FIG. 2 and FIG. 3 are schematic plan views illustrating exemplary embodiments of a structure of a liquid crystal display, according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower", "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "beneath" or "lower" relative to other elements or features would then be oriented "above" or "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of a liquid crystal display according to the invention will be described in brief with reference to the accompanying drawings.

FIG. 1A, FIG. 1B, FIG. 2 and FIG. 3 are schematic plan views illustrating exemplary embodiments of a structure of a liquid crystal display, according to the invention.

With reference to FIG. 1A, the liquid crystal display according to the invention includes the first pixel PXa, the second pixel PXb and the third pixel PXc. The first pixel PXa, the second pixel PXb and the third PXc each include a high pixel area PX_high and a low pixel area PX_low. An intensity of an electric field that is applied to a liquid crystal layer disposed in the high pixel area PX_high at a same condition, is larger than the intensity of an electric field that is applied to the liquid crystal layer disposed in the low pixel area PX_low at the same condition.

First portions of the high pixel area PX_high and the low pixel area PX_low of the first pixel PXa display the first color Ca, first portions of the high pixel area PX_high and the low pixel area PX_low of the second pixel PXb display the second color Cb, and first portions of the high pixel area PX_high and the low pixel area PX_low of the third pixel PXc display the third color Cc.

A second portion of the low pixel area PX_low of the first pixel PXa, a second portion of the low pixel area PX_low of the second pixel PXb, and a second portion of the low pixel area PX_low of the third pixel PXc each display the fourth color Cd.

Herein, the first color Ca, the second color Cb, and the third color Cc may be any one of red, blue and green, and the fourth color Cd may be white or yellow.

In the region of the liquid crystal display that displays the first color Ca, the second color Cb and the third color Cc, a color filter may be disposed. In addition, in the region of the liquid crystal display that displays the fourth color Cd, a color filter may be not be disposed (e.g., removed), and a white color filter and/or yellow color filter may be disposed.

The region of the liquid crystal display that displays the fourth color Cd (e.g., second portions of the pixels) is disposed at an edge of the first portions low pixel area PX_low that displays the first color Ca, the second color Cb and the third color Cc. In one exemplary embodiment, it is preferable that an area of the region that displays the fourth color Cd is about 20% or less of a total area of each pixel area PXa, PXb, and PXc, in the plan view.

A boundary between the first and second portions of the low pixel area PX_low is indicated by a dotted line in FIG. 1A. In the plan view, the high pixel area PX_high and the low pixel area PX_low of each pixel are separated from each other. Portions of the high pixel area PX_high and the low pixel area PX_low of each pixel may alternate in a longitudinal direction of the pixel. Similarly, second portions of the low pixel area PX_low may alternative with first portions of the of the low pixel area PX_low in the longitudinal direction of each pixel.

Figure 1B:
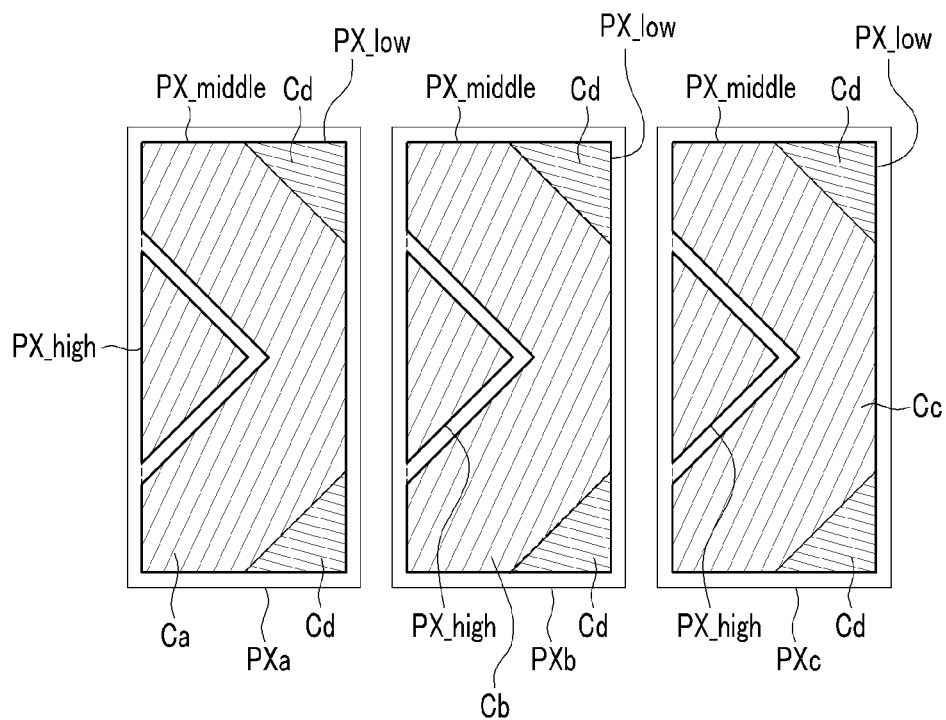

With reference to FIG. 1B, the liquid crystal display is similar to the liquid crystal display shown in FIG. 1A.

With reference to FIG. 1B, the liquid crystal display according to the invention includes the first pixel PXa, the second pixel PXb and the third pixel PXc. The first pixel PXa, the second pixel PXb and the third pixel PXc each include a high pixel area PX_high, an intermediate pixel area PX_middle, and a low pixel area PX_low. An intensity of an electric field that is applied to the liquid crystal layer disposed in the high pixel area PX_high at a same condition is relatively largest, an intensity of an electric field that is applied to the liquid crystal layer disposed in the low pixel area PX_low at the same condition is relatively smallest, and an intensity of an electric field that is applied to the liquid crystal layer disposed in the middle pixel area PX_middle is larger than the intensity of the electric field that is applied to the liquid crystal layer of the low pixel area PX_low and smaller than the intensity of the electric field that is applied to the liquid crystal layer of the high pixel area PX_high.

The high pixel area PX_high and middle pixel area PX_middle of the first pixel PXa display the first color Ca, the high pixel area PX_high and the middle pixel area PX_middle of the second pixel PXb display the second color Cb, and the high pixel area PX_high and the middle pixel area PX_middle of the third pixel PXc display the third color Cc. The low pixel area PX_low of the first pixel PXa, the low pixel area PX_low of the second pixel PXb, and the low pixel area PX_low of the third pixel PXc display the fourth color Cd.

Herein, the first color Ca, the second color Cb, and the third color Cc may be any one of red, blue and green, and the fourth color Cd may be white or yellow.

In the region of the liquid crystal display that displays the first color Ca, the second color Cb and the third color Cc, a color filter may be disposed. In addition, in the region of the liquid crystal display that displays the fourth color Cd, a color filter may not be disposed (e.g., removed), and a white color filter and/or yellow color filter may be disposed. In one exemplary embodiment, it is preferable that an area of the region that displays the fourth color Cd is about 20% or less of an area of each pixel area PXa, PXb, and PXc, in the plan view.

The middle pixel area PX_middle and the low pixel area PX_low are disposed directly adjacent to one another. In the plan view, the high pixel area PX_high and the middle pixel area PX_middle of each pixel are separated from each other. Portions of the high pixel area PX_high and the middle pixel area PX_middle of each pixel may alternate in a longitudinal direction of the pixel. Similarly, the low pixel area PX_low may alternative with the middle pixel area PX_middle in the longitudinal direction of each pixel.

Figure 2:
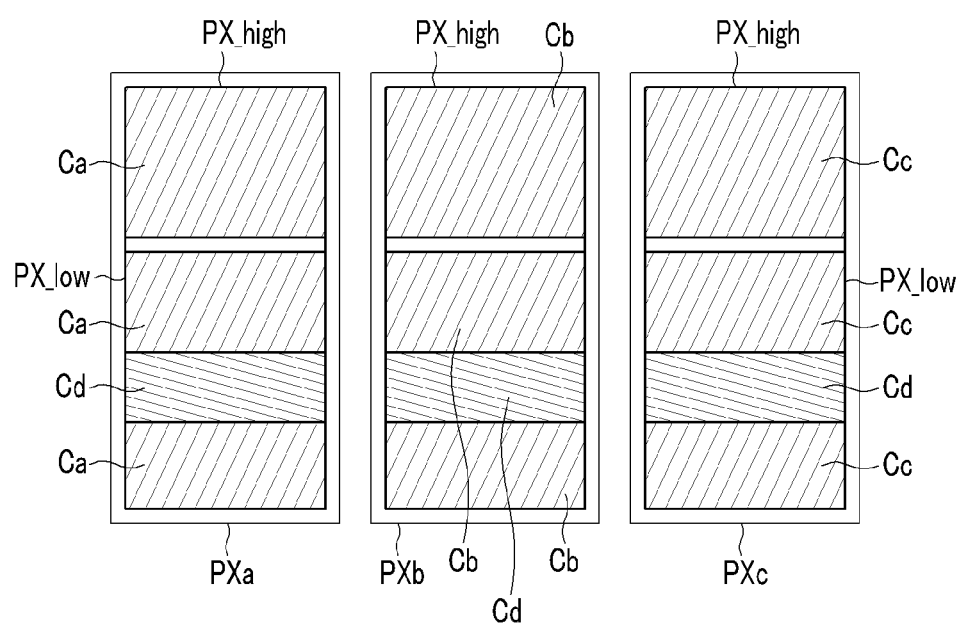

With reference to FIG. 2, the liquid crystal display is similar to the liquid crystal display shown in FIG. 1.

The liquid crystal display according to the exemplary embodiment includes the first pixel PXa, the second pixel PXb and the third pixel PXc, and the first pixel PXa, the second pixel PXb and the third pixel PXc each include the high pixel area PX_high and the low pixel area PX_low. An intensity of an electric field that is applied to a liquid crystal layer disposed in the high pixel area PX_high at a same condition, is larger than the intensity of an electric field that is applied to the liquid crystal layer disposed in the low pixel area PX_low at the same condition.

First portions of the high pixel area PX_high and the low pixel area PX_low of the first pixel PXa display the first color Ca, first portions of the high pixel area PX_high and the low pixel area PX_low of the second pixel PXb display the second color Cb, and first portions of the high pixel area PX_high and the low pixel area PX_low of the third pixel PXc display the third color Cc.

A second portion of the low pixel area PX_low of the first pixel PXa, a second portion of the low pixel area PX_low of the second pixel PXb, and a second portion of the low pixel area PX_low of the third pixel PXc display the fourth color Cd. In one exemplary embodiment, it is preferable that an area of the region that displays the fourth color Cd is about 20% or less of the area of each pixel area PXa, PXb, and PXc.

The arrangement of the high pixel area PX_high and low pixel area PX_low of each pixel PXa, PXb, and PXc is different from the liquid crystal display shown in FIGS. 1A and 1B. The high pixel area PX_high and low pixel area PX_low of the liquid crystal display according to the illustrated exemplary embodiment are disposed in upper and lower portions, respectively, of the pixel area. The region that displays the first color Ca, the second color Cb and the third color Cc is disposed around the region that displays the fourth color Cd, in each pixel PXa, PXb, and PXc, respectively.

The first and second portions of the low pixel area PX_low are disposed directly adjacent to one another, and alternate with each other in the low pixel area PX_low. In the plan view, the high pixel area PX_high and the low pixel area PX_low of each pixel are separated from each other.

Figure 3:
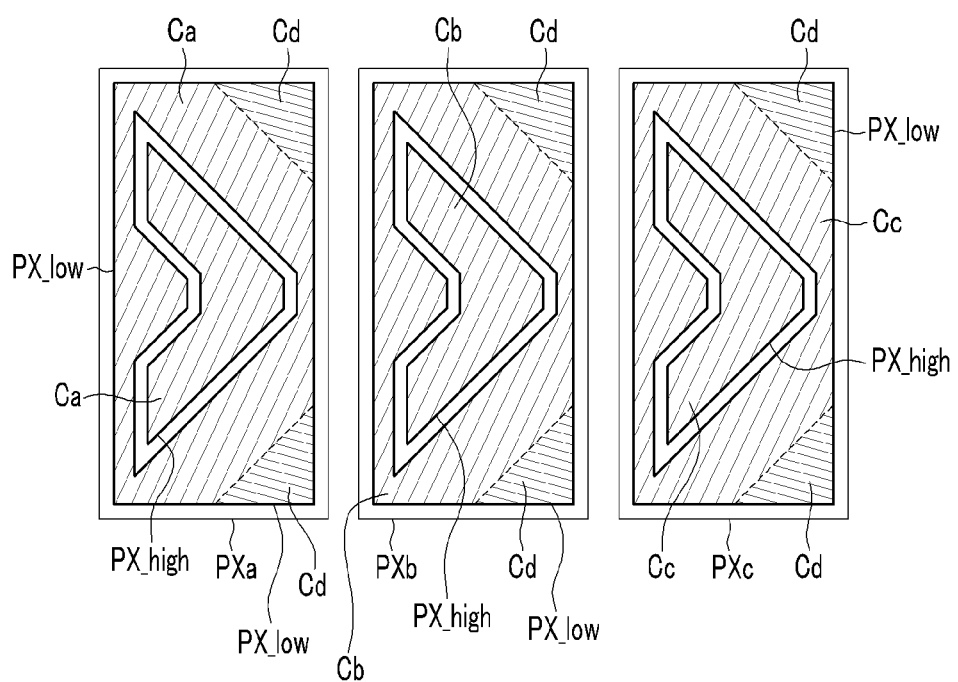

Next, with reference to FIG. 3, the liquid crystal display is similar to the liquid crystal display shown in FIG. 1.

The liquid crystal display includes the first pixel PXa, the second pixel PXb and the third pixel PXc, and the first pixel PXa, the second pixel PXb and the third pixel PXc each include the high pixel area PX_high and the low pixel area PX_low. An intensity of an electric field that is applied to a liquid crystal layer disposed in the high pixel area PX_high at a same condition, is larger than the intensity of an electric field that is applied to the liquid crystal layer disposed in the low pixel area PX_low at the same condition.

First portions of the high pixel area PX_high and the low pixel area PX_low of the first pixel PXa display the first color Ca, first portions of the high pixel area PX_high and the low pixel area PX_low of the second pixel PXb display the second color Cb, and first portions of the high pixel area PX_high and the low pixel area PX_low of the third pixel PXc display the third color Cc.

A second portion of the low pixel area PX_low of the first pixel PXa, a second portion of the low pixel area PX_low of the second pixel PXb, and a second portion of the low pixel area PX_low of the third pixel PXc display the fourth color Cd.

In one exemplary embodiment, it is preferable that an area of the region that displays the fourth color Cd is about 20% or less of an area of each pixel area PXa, PXb, and PXc.

The arrangement of the high pixel area PX_high and low pixel area PX_low of each pixel PXa, PXb, and PXc is different from the liquid crystal display shown in FIGS. 1A and 1B. The high pixel area PX_high of the liquid crystal display according to the illustrated exemplary embodiment is completely surrounded by the low pixel area PX_low. The region that displays the fourth color Cd is disposed at an edge of the low pixel area PX_low that displays the first color Ca, the second color Cb and the third color Cc.

A boundary between the first and second portions of the low pixel area PX_low is indicated by a dotted line in FIG. 3. In the plan view, the high pixel area PX_high and the low pixel area PX_low of each pixel are separated from each other.

Figure 4:
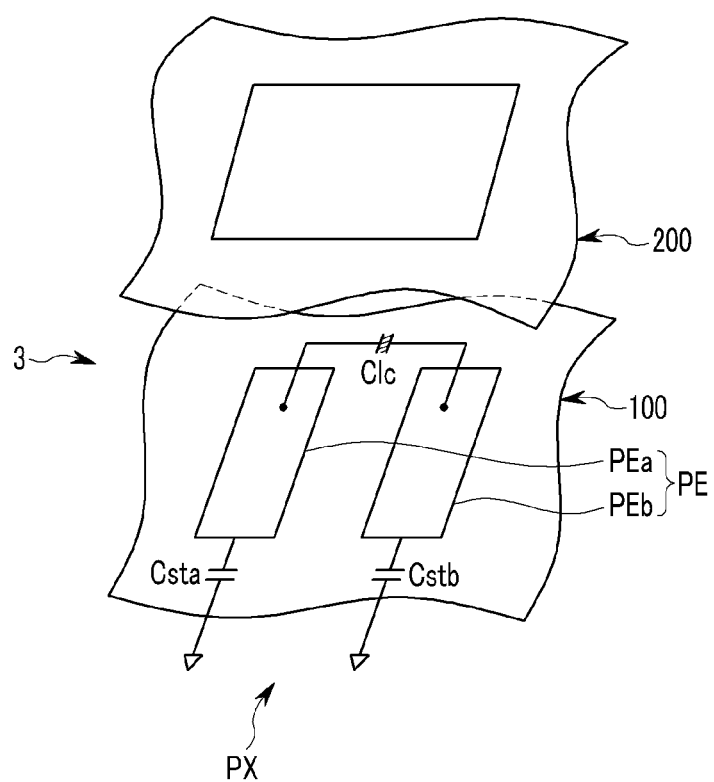
FIG. 4 is an equivalent circuit diagram illustrating an exemplary embodiment of a pixel in conjunction with a structure of the liquid crystal display, according to the invention.
Figure 5:
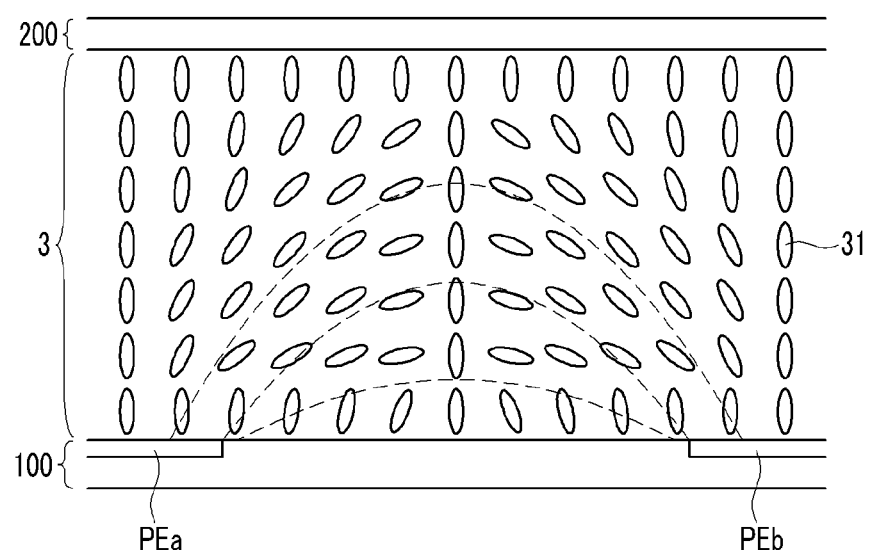
FIG. 5 is a schematic cross-sectional view of a driving method of the liquid crystal display of FIG. 4.
Figure 6:
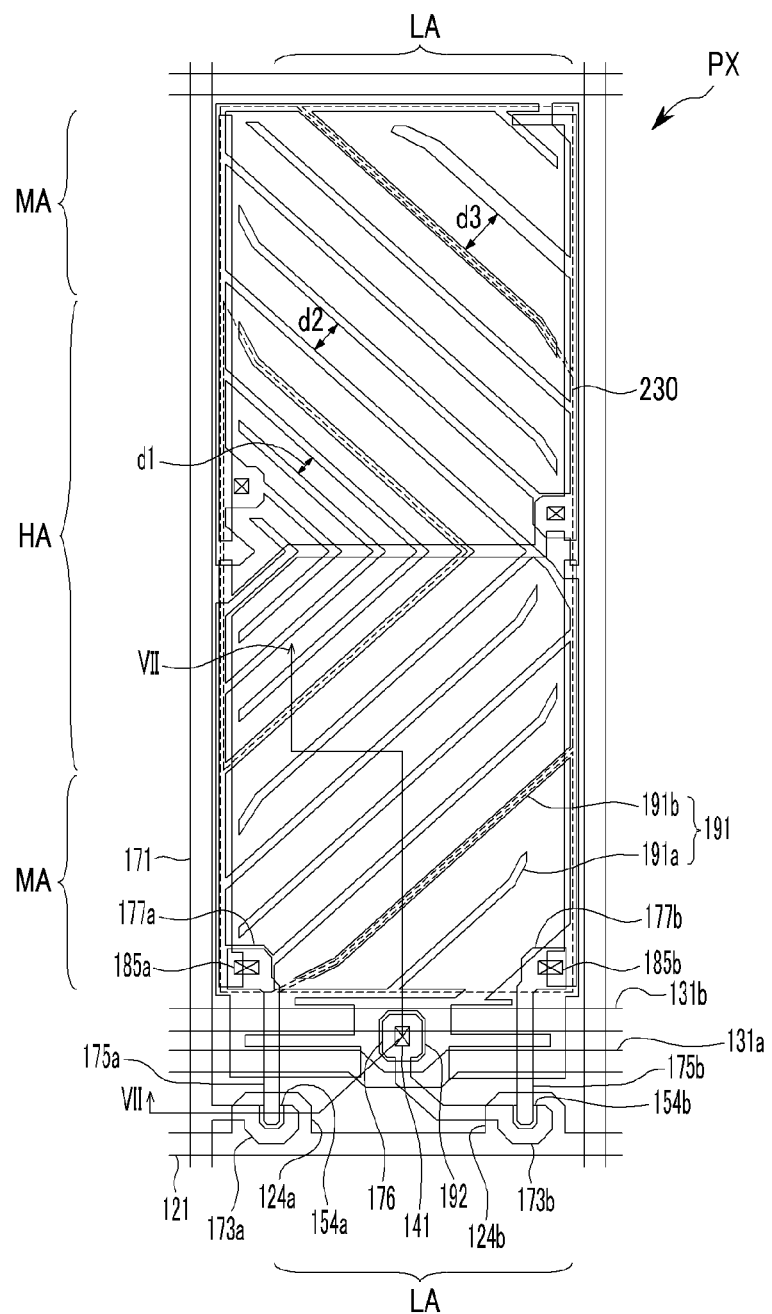
FIG. 6 is a plan view of an exemplary embodiment of a liquid crystal display, according to the invention.
Figure 7:
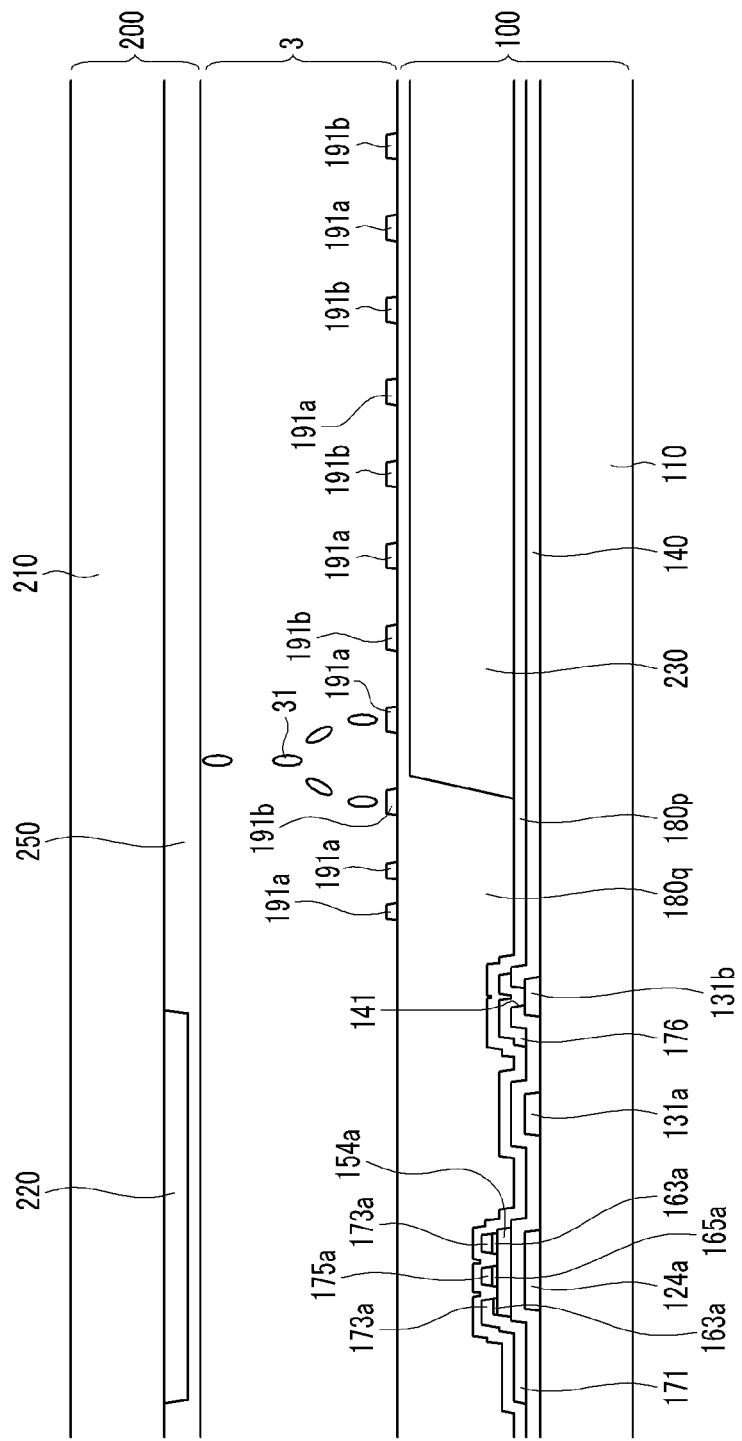
FIG. 7 is a cross-sectional view taken along line VII-VII of the liquid crystal display of FIG. 6.

Hereinafter, exemplary embodiments of a liquid crystal display according to the invention will be described in detail with reference to FIG. 4 to FIG. 7. FIG. 4 is an equivalent circuit diagram illustrating an exemplary embodiment of a pixel in conjunction with a structure of the liquid crystal display, according to the invention, FIG. 5 is a schematic cross-sectional view of an exemplary embodiment of a liquid crystal display, according to the invention, FIG. 6 is a plan view of an exemplary embodiment of a liquid crystal display, according to the invention, and FIG. 7 is a cross-sectional view taken along line VII-VII of the liquid crystal display of FIG. 6.

With reference to FIG. 4, the liquid crystal display includes a lower display panel 100 and upper display panel 200 that face each other, and a liquid crystal layer 3 that is disposed between two display panels 100 and 200. Each pixel PX includes a switching element (not shown) that is connected to a signal line (not shown), a liquid crystal capacitor Clc that is connected thereto, and the first and the second storage capacitors Csta and Cstb. The first and the second storage capacitors Csta and Cstb may be omitted if necessary.

A pixel electrode PE includes a first pixel electrode PEa and a second pixel electrode PEb. The liquid crystal capacitor Clc uses the first pixel electrode PEa and the second pixel electrode PEb of the lower display panel 100 as two terminals, and the liquid crystal layer 3 that is disposed between the first and the second pixel electrode PEa and PEb acts as a dielectric material.

The liquid crystal layer 3 has a dielectric anisotropy, and liquid crystal molecules of the liquid crystal layer 3 may be aligned so that long axes thereof are vertical (e.g., perpendicular) with respect to the surface of two display panels in a state in which there is no electric field.

The first and the second storage capacitors Csta and Cstb that act as an auxiliary capacitor of the liquid crystal capacitor Clc, may be formed so that a separate electrode (not shown) disposed on the lower display panel 100 overlaps an area between the first and the second pixel electrode PEa and PEb and the insulator.

In order to implement color displaying, a desired color is recognized as the spatial and temporal sum of the primary colors, by intrinsically displaying one or more of the primary colors by each pixel PX. The primary color may include three primary colors such as red, green and blue, a white color, or a yellow color.

With reference to FIG. 5, an exemplary embodiment of a driving method of the liquid crystal display according to the illustrated exemplary embodiment in FIG. 4 will be described.

With reference to FIG. 4 and FIG. 5, if different voltages are applied to the first pixel electrode PEa and the second pixel electrode PEb, a difference between the different two voltages applied to the first pixel electrode PEa and the second pixel electrode PEb is displayed as the charge voltage of the liquid crystal capacitor Clc, that is, the pixel voltage. If a potential difference occurs at both ends of the liquid crystal capacitor Clc, as shown in FIG. 5, an electric field is substantially parallel to the surface of the display panels 100 and 200 on the liquid crystal layer 3, between the first pixel electrode PEa and the second pixel electrode PEb. When liquid crystal molecules 31 have a positive dielectric anisotropy, the liquid crystal molecules 31 are inclined to be parallel to a direction of the electric field, and the degree of inclination varies according to the size of the pixel voltage. According to the degree of inclination of the liquid crystal molecules 31, the degree of polarization of light that passes through the liquid crystal layer 3 varies. The variation of the polarization is displayed as a variation in transmittance of light by a polarizer, and a desired predetermined luminance is displayed by the pixel PX.

Now, with reference to FIG. 6 and FIG. 7, an exemplary embodiment of the liquid crystal display described with reference to FIG. 4 and FIG. 5 will be described in detail.

With reference to FIG. 6 and FIG. 7, the liquid crystal display includes a lower display panel 100 and upper display panel 200 that face each other, and a liquid crystal layer 3 that is disposed between two display panels 100 and 200.

First, the lower display panel 100 will be described.

A plurality of gate conductors that include a plurality of a gate line 121, a plurality of a storage electrode line 131a, and a plurality of a power supplying line 131b are disposed on an insulation substrate 110.

The gate line 121 transfers a gate signal and longitudinally extends in a transverse (e.g., horizontal) direction, in the plan view. Each gate line 121 includes a plurality of a first and a second gate electrode 124a and 124b that protrude upward from a main portion of the gate line 121, in the plan view of the liquid crystal display.

The storage electrode line 131a is applied with a predetermined voltage, and longitudinally extends in the transverse direction, parallel with the gate line 121. Each storage electrode line 131a is disposed between two gate lines 121 that are adjacent to each other in the plan view, and is closer to the gate line 121 that is positioned at a lower part of the pixel PX.

The gate conductors 121, 131a, and 131b may have a single layer or multilayer structure in a cross-sectional view.

A gate insulating layer 140 including silicon nitride (SiNx) or silicon oxide (SiOx), is disposed directly on and contacting the gate conductors 121, 131a, and 131b.

A plurality of a first and a second semiconductor island 154a and 154b including hydrogenated amorphous or polysilicon, are disposed directly on the gate insulating layer 140. The first and the second semiconductors 154a and 154b are disposed overlapping the first and the second gate electrodes 124a and 124b, respectively.

A pair of ohmic contact islands 163a and 165a are disposed overlapping each first semiconductor 154a, and a pair of ohmic contact islands (not shown) are formed on each second semiconductor 154b. The ohmic contact islands 163a and 165a may include a material such as n+ hydrogenated amorphous silicon to which an n-type impurity such as phosphorus is doped at a high concentration, or silicide.

A data line 171 including a first source electrode 173a, and data conductors including a first drain electrode 175a, a second drain electrode 175b, and a second source electrode 173b, are disposed on and overlapping the ohmic contact islands 163a and 165a and the gate insulating layer 140.

The data line 171 transports a data signal and longitudinally extends in a longitudinal (e.g., vertical) direction in the plan view, and crosses the gate line 121, storage electrode line 131a and the power supplying line 131b.

The first drain electrode 175a and the second drain electrode 175b each include a linear or rod-shaped distal end portion in the plan view, and a first extended portion 177a and a second extended portion 177b having the wide area, respectively.

The rod-shaped end portion of the first drain electrode 175a and the rod-shaped end portion of the second drain electrode 175b faces the first source electrode 173a and the second source electrode 173b, overlaps with a center of the first gate electrode 124a and the second gate electrode 124b, and a portion thereof is surrounded by a bent portion of the first source electrode 173a and the second source electrode 173b, respectively, in the plan view.

An end portion 176 of the second source electrode 173b is physically and electrically connected to the power supplying line 131b, through a contact hole 141 extending through the gate insulating layer 140, to receive a predetermined voltage.

The data conductors 171, 173b, 175a, and 175b may have a single layer or multilayer structure in a cross-sectional view.

The ohmic contact islands 163a and 165a are respectively disposed between only the semiconductors 154a and 154b therebeneath, and the data conductors 171a, 171b, 175a, and 175b thereon, and lower contact resistance therebetween. Relative to the semiconductors 154a and 154b, there is a space between the source electrode 173a and the drain electrode 175a, a space between the source electrode 173b and the drain electrode 175b, and an exposed portion of the semiconductors 154a and 154b that is not overlapped with any of the data conductors 171a, 171b, 175a, and 175b.

A lower passivation layer 180p is disposed on the data conductors 171a, 171b, 175a, and 175b, and directly contacts the exposed portion of the semiconductors 154a and 154b in the spaces between the source electrodes 173a and 173b, and the drain electrodes 175a and 175b.

The lower passivation layer 180p includes an inorganic insulator, such as silicon nitride or silicon oxide, and can reduce or effectively prevent a component of a color filter 230 disposed on the lower passivation layer 180p, from being diffused to a thin film transistor disposed beneath the lower passivation layer 180p.

On the lower passivation layer 180p, a plurality of the color filter 230 is disposed. The color filter 230 may display any one of three primary colors such as red, green and blue, and may include an organic material that includes a pigment that displays any one of three primary colors.

The color filter 230 is not disposed on a portion of the pixel. An area or region in which the color filter 230 is not disposed displays a white or yellow color.

In the illustrated exemplary embodiment, a color filter 230 is disposed in the lower display panel 100, but in another exemplary embodiment, a color filter 230 may be disposed within the upper display panel 200.

On the lower passivation layer 180p and on the plurality of the color filter 230, an upper passivation layer 180q is disposed. The upper passivation layer 180q includes an organic insulator, and may include an organic material that has photosensitivity. In addition, it is preferable that the upper passivation layer 180q has a thickness of 1.0 micrometer (μm) or more, in order to lower a coupling phenomenon between a pixel electrode 191 and the data line 171 and to planarize the lower display panel 100. The upper passivation layer 180q reduces or effectively prevents peeling of the color filter 230, suppresses contamination of the liquid crystal layer 3 by the organic material of the solvent that inflows from the color filter 230, and reduces or effectively prevents defects such as afterimages, that may occur when an image is displayed by the liquid crystal display.

In the upper passivation layer 180q and the lower passivation layer 180p, a plurality of contact holes 185a and 185b is respectively extended to expose the first extended portion 177a of the first drain electrode 175a, and the second extended portion 177b of the second drain electrode 175b.

On the upper passivation layer 180q, a plurality of the pixel electrode 191 is disposed. The pixel electrode 191 includes a plurality of a first and a second pixel electrode 191a and 191b which include a transparent conductive material such as ITO (indium tin oxide) or IZO (indium zinc oxide), or a reflective metal such as aluminum, silver, chromium or an alloy thereof.

An overall external shape of one pixel electrode 191 is quadrangle, and the first and the second pixel electrodes 191a and 191b each include a plurality of branched portions. The branched portions of the first and the second pixel electrodes 191a and 191b are arranged at a predetermined interval with each other, and alternately disposed with the interval to form a pattern of comb-like teeth. An angle between the branched portion and the gate line 121, or a virtual transverse central line (not shown), may be about 45°. Each of the first pixel electrode 191a and the second pixel electrode 191b, is a single unitary and indivisible member.

The pixel is divided into two upper and lower subregions with the virtual transverse central line as the interface. Each subregion includes a first region HA that corresponds to the narrowest interval d1 between the first pixel electrode 191a and the second pixel electrode 191b, a second region MA that corresponds to the interval d2 that is wider than the first region HA between the first pixel electrode 191a and the second pixel electrode 191b, and a third region LA that corresponds to the widest interval d3 between the first pixel electrode 191a and the second pixel electrode 191b. That is, in the second region MA, the interval d2 between the first pixel electrode 191a and the second pixel electrode 191b is wider than the interval d1 between the first pixel electrode 191a and the second pixel electrode 191b in the first region HA, and narrower than the interval d3 between the first pixel electrode 191a and the second pixel electrode 191b in the third region LA.

In one exemplary embodiment, for example, the interval d1 between the first pixel electrode 191a and the second pixel electrode 191b of the first region HA is about 8.5 to 9.5 micrometers (μm), and may be about 9 μm. The interval d2 between the first pixel electrode 191a and the second pixel electrode 191b of the second region MA is about 14.5 to 15.5 μm, and may be about 15 μm. The interval d3 between the first pixel electrode 191a and the second pixel electrode 191b of the third region LA is about 18.5 to 19.5 μm, and may be about 19 μm.

The color filter 230 as described above is disposed in the first region HA and the second region MA, and is not disposed in the third region LA. That is, the third region LA excludes the color filter 230. In one exemplary embodiment, it is preferable that a planar area of the third region LA from which the color filter 230 is not disposed, is about 20% or less of a total planar area of the pixel. In addition, it is preferable that the planar area of the third region LA in which the color filter 230 is not disposed, is the same as or smaller than a planar area of the first region HA, and about one-third or less of a planar area of the second region MA.

The first and the second pixel electrodes 191a and 191b are physically and electrically connected to the first and the second drain electrodes 175a and 175b through the contact holes 185a and 185b to receive the voltage from the first and the second drain electrodes 175a and 175b, respectively. The first and the second pixel electrodes 191a and 191b constitute the liquid crystal capacitor Clc in conjunction with the liquid crystal layer 3 therebetween.

The first pixel electrode 191a receives the data voltage from the first drain electrode 175a, and the second pixel electrode 191b receives a predetermined voltage that flows through the power supplying line 131b from the second drain electrode 175b. A difference in voltage that is applied to the first pixel electrode 191a and the second pixel electrode 191b is a voltage that corresponds to luminance that is displayed by the pixel PX, and polarities thereof may opposites with reference to the reference voltage.

If the voltage is applied to the first pixel electrode 191a and the second pixel electrode 191b, an electric field is applied to the liquid crystal molecule 31 between the first pixel electrode 191a and the second pixel electrode 191b due to the difference in voltage applied to the first pixel electrode 191a and the second pixel electrode 191b. An intensity of electric field that is applied to the liquid crystal molecule 31 disposed in the first region HA including the narrowest interval d1 between the first pixel electrode 191a and the second pixel electrode 191b is largest, an intensity of electric field that is applied to the liquid crystal molecule 31 disposed in the third region LA including the widest interval d3 between the first pixel electrode 191a and the second pixel electrode 191b is smallest, and an intensity of electric field that is applied to the liquid crystal molecule 31 disposed in the second region MA has a value between intensities of the electric field applied to the liquid crystal molecule disposed in the first region HA and the third region LA.

By dividing one pixel PX into three regions HA, MA, and LA in which the electric fields that are applied to the liquid crystal layer 3 are different from each other, alignment directions of the liquid crystal molecule 31 are made different, so that it is possible to improve the visibility in left and right viewing angle directions.

Next, the upper display panel 200 will be described.

A light blocking member 220 is disposed on an insulation substrate 210 including transparent glass or plastic or the like. The light blocking member 220 reduces or effectively prevents light leakage between the pixel electrodes 191 and defines an opening region that faces the pixel electrode 191. While the light blocking member 220 of the illustrated embodiment is in the upper display panel 200, an alternative embodiment may include the light blocking member 220 disposed in the lower display panel 100.

On the insulation substrate 210 and the light blocking member 220, an overcoat 250 is disposed. The overcoat 250 may include (organic) insulator, and reduces or effectively prevents exposure of the pigment component of the light blocking member 220 to the liquid crystal layer 3, and provides a planarization surface of the upper display panel 220. In an alternative embodiment, the overcoat 250 may be omitted.

An alignment layer (not shown) is coated on an inner surface of the lower display panel 100 and/or an inner surface of the upper display panel 200, and may be a vertical alignment layer.

A polarizer (not shown) may be provided on the outer surface of the display panels 100 and 200.

The liquid crystal layer 3 that is disposed between the lower display panel 100 and the upper display panel 200 includes the liquid crystal molecule 31 that has a positive dielectric anisotropicity, and the liquid crystal molecules 31 may be aligned so that long axes thereof are vertical (e.g. perpendicular) with respect to the surfaces of two display panels 100 and 200, in a state in which there is no electric field.

If two voltages that have different polarities are applied to the first and the second pixel electrodes 191a and 191b, an electric field that is substantially parallel with respect to planar surfaces of the display panels 100 and 200, is generated. The liquid crystal molecules of the liquid crystal layer 3 that are vertically aligned with respect to the surfaces of the display panels 100 and 200 at an initial position respond to the electric field, so that long axes thereof are inclined in a direction that is transverse to the direction of the electric field, and the degree of change of polarization of incident light to the liquid crystal layer 3 depends on the inclination degree of the liquid crystal molecule 31. The change of polarization is displayed as a change of transmittance by the polarizer, and the liquid crystal display displays images through this.

As described above, if the vertically aligned liquid crystal molecules 31 are used, a contrast ratio of the liquid crystal display may be increased and the wide viewing angle can be implemented. In addition, by applying two voltages having different polarities to the reference voltage for one pixel PX, it is possible to increase the driving voltage and make a response speed rapid. In addition, since an effect of kickback voltage is removed, it is possible to reduce or effectively prevent a flicker phenomenon.

In addition, if the liquid crystal molecules 31 that are vertically aligned with respect to the display panels 100 and 200 are used, the contrast ratio of the liquid crystal display may be increased and the wide viewing angle can be implemented. In addition, the liquid crystal molecule 31 that has positive dielectric anisotropicity has the larger dielectric anisotropicity and the lower rotation viscosity, as compared to the liquid crystal molecule 31 that has negative dielectric anisotropicity, it is possible to obtain a rapid response speed.

In addition, as described above, by dividing one pixel PX of the liquid crystal display according to the invention into at least two regions in which the intensities of the electric field applied to the liquid crystal layer 3 are different from each other, in more detail, three regions HA, MA, and LA, the alignment directions of the liquid crystal molecules are made different from each other, so that the visibilities of left and right viewing angle directions can be improved.

In the illustrated exemplary embodiment, one pixel PX of the liquid crystal display is divided into three regions HA, MA, and LA in which the intensities of the electric fields applied to the liquid crystal layer 3 are different from each other, but the one pixel PX may be divided into two regions that include a first region in which the intensity of the electric field applied to the liquid crystal layer 3 is large and a second region in which the intensity of the electric field that is applied to the liquid crystal layer 3 is small.

Where there are two regions as described above, the color filter 230 is disposed in the region in which the intensity of the electric field applied to the liquid crystal layer 3 is large. The color filter 230 is further disposed in a portion of the region in which the intensity of the electric field that is applied to the liquid crystal layer 3 is small. The color filter 230 may not be disposed in a remaining portion of the region in which the intensity of the electric field that is applied to the liquid crystal layer 3 is small. A planar area of the remaining portion of the region not including the color filter 230 and in which the intensity of the electric field applied to the liquid crystal layer 3 is small in one pixel, is 20% or less of a total planar area of the pixel. A planar area of the remaining portion of the region not including the color filter 230 and in which the intensity of electric field is small, is one half or less of the portion of the region in which the color filter is disposed and in which the intensity of electric field is small.

Referring to FIGS. 1A, 1B, 6 and 7, where the pixel includes a first region (MA and LA) in which an interval (d2, d3) between adjacent branched electrodes of the first pixel electrode 191a and branched electrodes of the second pixel electrode 191b is a first distance, and a second region (HA) in which an interval (d1) between adjacent branched electrodes of the first pixel electrode 191a and branched electrodes of the second pixel electrode 19b is a second distance smaller than the first distance, a portion of the first region (MA) and an entire of the second region (HA) display a first color, and another portion (LA) of the first region displays a second color.

In addition, the color filter 230 is disposed only in the first region HA and the second region MA in which the intensity of electric field that is applied to the liquid crystal layer 3 is relatively large, and is not disposed in the third region LA in which the intensity of electric field that is applied to the liquid crystal layer 3 is relatively small. Where the third region LA in which the intensity of electric field applied to the liquid crystal layer 3 is smallest, light is not transmitted at a low grayscale, but light is transmitted at a high grayscale. Therefore, the liquid crystal display according to the illustrated exemplary embodiment, at a low grayscale, since light is transmitted only in the first region HA and the second region MA, light that is transmitted through the color filter 230 is displayed, so that the color reproducibility is increased. At a high grayscale that is a middle grayscale or more, since light is transmitted in the first region HA, the second region MA and the third region LA, light that is transmitted through the color filter 230 and light of the third region LA from which the color filter 230 is not disposed are displayed, so that the luminance is increased. Therefore, it is possible to increase the color reproducibility at a low grayscale and to increase the luminance at a high grayscale.

Figure 8:
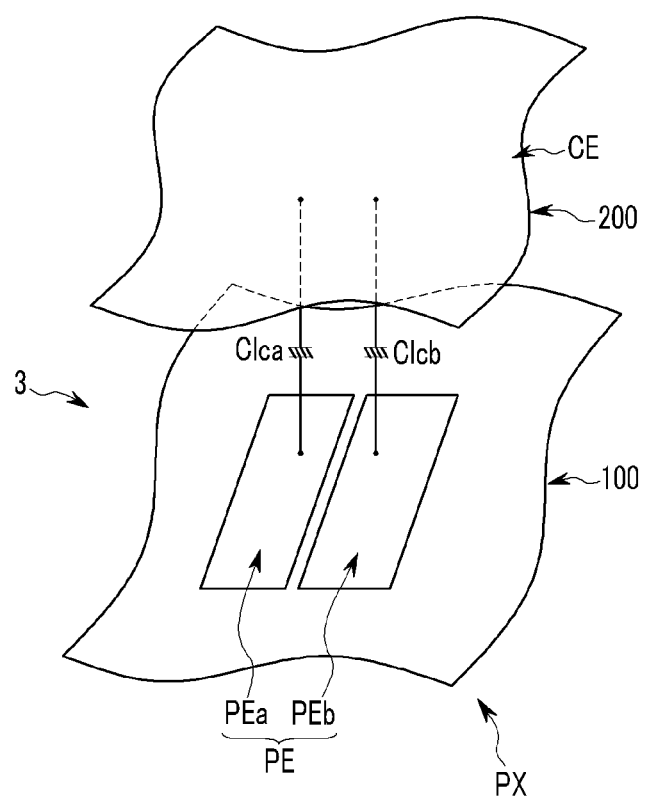
FIG. 8 is an equivalent circuit diagram illustrating another exemplary embodiment of a pixel in conjunction with a structure of a liquid crystal display, according to the invention.
Figure 9:
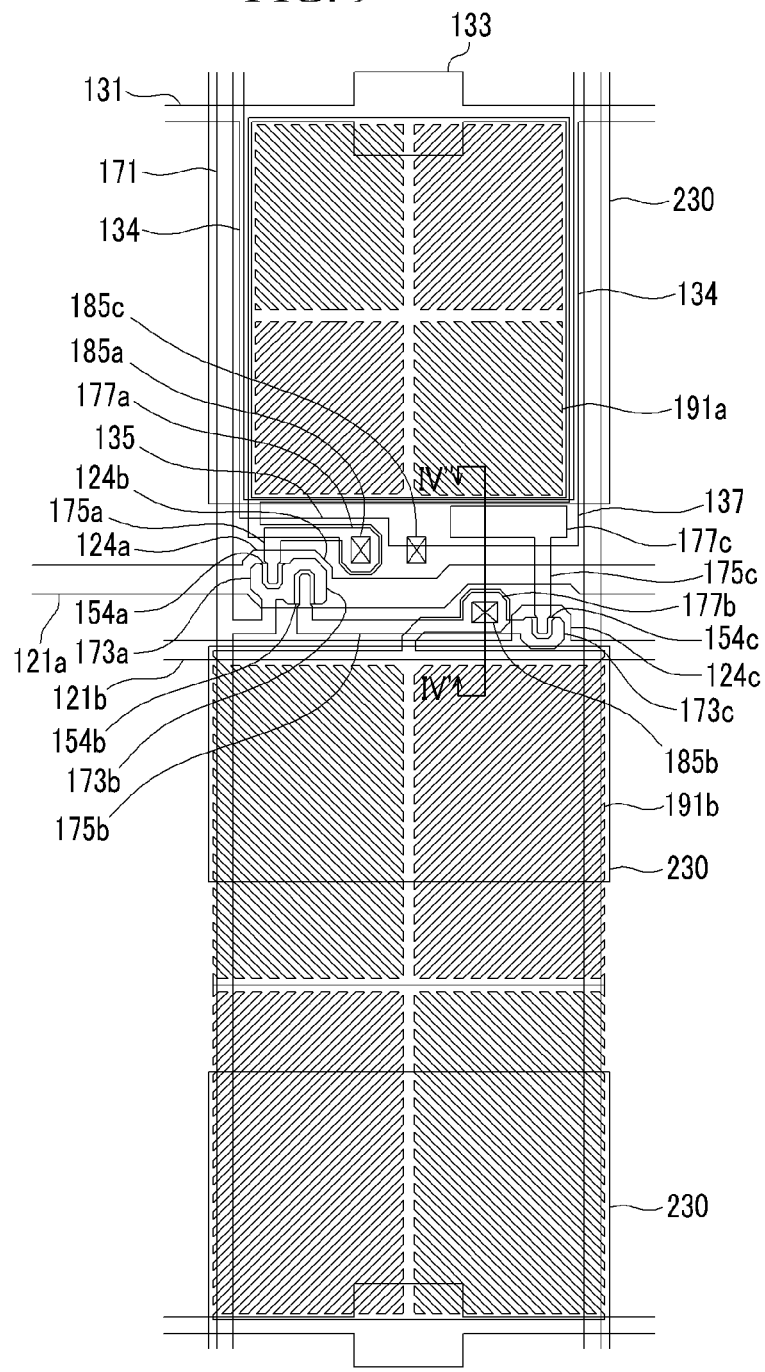
FIG. 9 is a plan view of another exemplary embodiment of a liquid crystal display, according to the invention.
Figure 10:
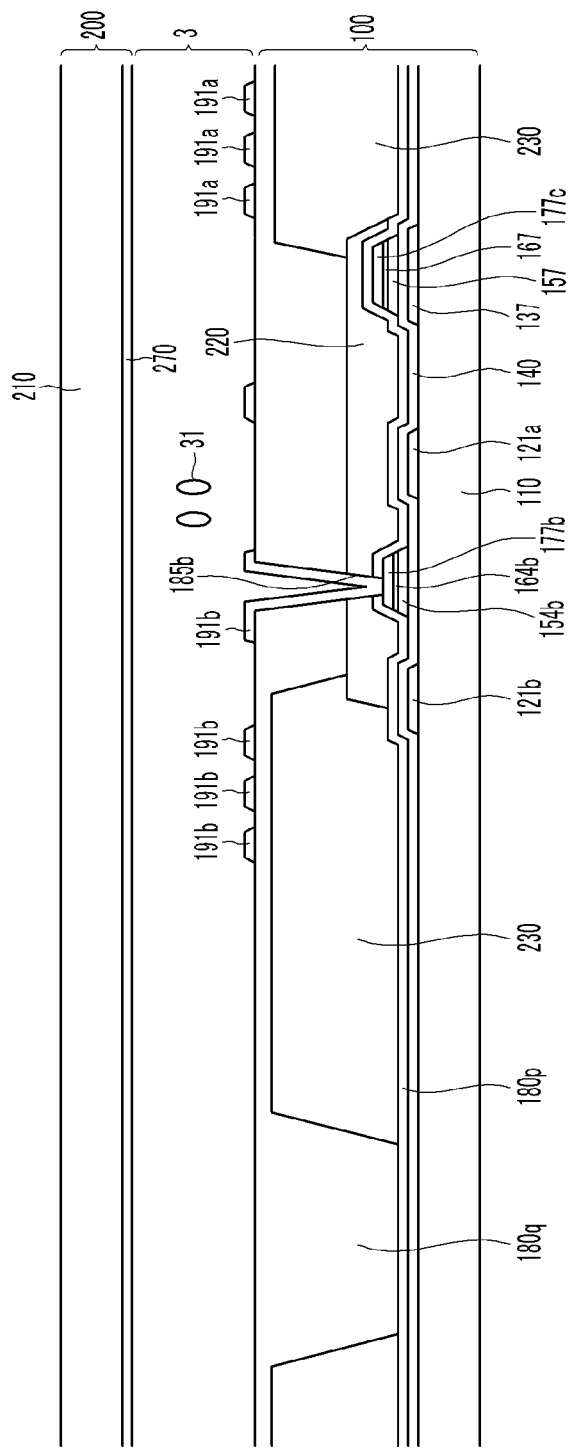
FIG. 10 is a cross-sectional view taken along line IV-IV of the liquid crystal display of FIG. 9.

Next, with reference to FIG. 8 and FIG. 10, another exemplary embodiment of a liquid crystal display, according to the invention will be described. FIG. 8 is an equivalent circuit diagram illustrating another exemplary embodiment of a pixel in conjunction with a structure of the liquid crystal display, according to the invention, FIG. 9 is a plan view of another exemplary embodiment of a liquid crystal display, according to the invention, and FIG. 10 is a cross-sectional view that is taken along line IV-IV of the liquid crystal display of FIG. 9.

As shown in FIG. 8, the liquid crystal display includes a lower display panel 100 and upper display panel 200 that face each other, and a liquid crystal layer 3 that is disposed between two display panels 100 and 200.

Liquid crystal capacitors Clca and Clcb use sub-pixel electrodes PEa and PEb of the lower display panel 100, and a common electrode CE of the upper display panel 200 as two terminals. The liquid crystal layer 3 between the sub-pixel electrode PEa and PEb and the common electrode CE acts as a dielectric material. A pair of sub-pixel electrodes PEa and PEb are separated from each other, and constitute one pixel electrode PE. The common electrode CE is disposed on an entire surface of the upper display panel 200 and receives a common voltage. The liquid crystal layer 3 has a negative dielectric anisotropy, and the liquid crystal molecule of the liquid crystal layer 3 may be aligned so that long axes thereof are vertical (e.g. perpendicular) with respect to the surface of two display panels in a state in which there is no electric field.

In order to implement color displaying, each pixel intrinsically displays three primary colors such as red, green and blue colors, and at least two of white or yellow colors. A first region that is occupied by the first pixel electrode PEa and a portion of a second region that is occupied by the second pixel electrode PEb displays one of primary colors, and a remaining portion of the second region that is occupied by the second pixel electrode PEb displays white or yellow colors.

A polarizer (not shown) may be provided on an outer surface of the display panels 100 and/or 200, and polarization axes of two polarizers may be orthogonal to each other. In the case of a reflective liquid crystal display, any one of the two polarizers may be omitted. Where polarization axes of the two polarizers are orthogonal to each other, the polarizers block incident light that is irradiated to the liquid crystal layer 3 in which there is no electric field.

Now, with reference to FIG. 9 and FIG. 10, an exemplary embodiment of the liquid crystal display that is described with reference to FIG. 8 will be described in detail.

First, the lower display panel 100 will be described.

A plurality of gate conductors that includes a plurality of gate lines 121a and 121b, and capacity voltage line 131 are disposed on an insulation substrate 110. A first gate line 121a includes a first gate electrode 124a and the second gate electrode 124b, and a second gate line 121b includes a third gate electrode 124c.

The capacity voltage line 131 transfers a predetermined capacity voltage, is disposed on an upper portion of the pixel in the plan view, and includes a stem that extends substantially parallel to the gate lines 121a and 121b and a plurality of a branch that extends from the stem. Each branch includes a vertical portion 134, a transverse portion 135, and a capacity electrode 137, and the stem includes a storage electrode 133 that has upper and lower wide areas. The vertical portion 134 linearly extends from the stem downward, and the transverse portion 135 meets with the vertical portion 134, in the plan view. The capacity electrode 137 protrudes downward from the transverse portion 135 in the range of the center of the transverse portion 135 to the right vertical portion 134. The shape and arrangement of the capacity voltage line 131 may be changed into various forms.

On the gate conductors 121a, 121b, and 131, a gate insulating layer 140 is disposed.

On the gate insulating layer 140, a semiconductor stripe is disposed. The semiconductor stripe includes a stem portion that longitudinally extends in a vertical direction, and a plurality of a first branched portion 154a, a second branched portion 154b and a third branched portion 154c that respectively extend toward the first gate electrode 124a, the second gate electrode 124b and the third gate electrode 124c, in the plan view. A plurality of the first branched portions 154a, the second branched portion 154b and the third branched portion 154c includes first to the third element portions (not shown) that are disposed on the first gate electrode 124a, the second gate electrode 124b and the third gate electrode 124c, respectively. The third branched portion 154c extends to form a fourth branched portion 157.

On the semiconductors 154a, 154b, 154c, and 157, an ohmic contact stripe, a first ohmic contact island (not shown), a second ohmic contact island (not shown), a third ohmic contact island (not shown) and the fourth ohmic contact island 167 that includes a protrusion portion 164b, are disposed. The ohmic contact stripe includes a first protrusion portion (not shown) that forms a pair in conjunction with the first ohmic contact island and is disposed on the first protrusion portion of the semiconductor, a second protrusion portion (not shown) that forms a pair in conjunction with the second ohmic contact island and is disposed on the second protrusion portion of the semiconductor, and a third protrusion portion (not shown) that forms a pair in conjunction with the third ohmic contact island and is disposed on the third protrusion portion of the semiconductor.

On the ohmic contacts 164 and 167 and gate insulating layer 140, a data conductor that includes a plurality of a data line 171, and a plurality of a first drain electrode 175a, a second drain electrode 175b, a third source electrode 173c and a third drain electrode 175c is disposed formed.

The data line 171 includes a plurality of a first source electrode 173a and a second source electrode 173b.

The first to the third drain electrodes 175a, 175b, and 175c respectively include first to the third extended portions 177a, 177b, and 177c that are a wide (first) end portion. An opposing (distal) end of the first to the third drain electrodes 175a, 175b, and 175c are (second) rod-shaped end portion. A portion of the rod-shaped distal end portions of the first drain electrode 175a, the second drain electrode 175b and the third drain electrode 175c is surrounded by the first source electrode 173a, the second source electrode 173b and the third source electrode 173c, respectively. The third source electrode 173c is connected to the second extended portion 177b of the second drain electrode 175b, that is, the third source electrode 173c and the second extended portion 177b collectively form a single unitary indivisible member of the second drain electrode 175b.

The semiconductors 154a, 154b, 154c, and 157 have a plan view shape that is substantially the same as the data line 171, the first to the third electrode members 175a, 175b, and 175c, and ohmic contact islands 163a, 165a, and 167c. However, relative to the semiconductors, there is a space between the source electrodes 173a, 173b, and 173c and the drain electrodes 175a, 175b, and 175c, and an exposed portion of the semiconductors 154a, 154b, 154c, and 157 that is not overlapped by the data line 171 and drain electrodes 175a, 175b, and 175c.

A lower passivation layer 180p is disposed on the data conductors 171, 175a, 175b, 175c and the exposed portion of the semiconductors 154a, 154b, and 154c.

The lower passivation layer 180p includes an inorganic insulator such as silicon nitride or silicon oxide, and can reduce or effectively prevent a component of a color filter 230 disposed on the lower passivation layer 180p from being diffused to a thin film transistor disposed beneath the lower passivation layer 180p.

On the lower passivation layer 180p, a light blocking member 220 is disposed directly contacting the lower passivation layer 180p. The light blocking member 220 may be called a black matrix and reduces or effectively prevents light leakage between pixel electrodes 191. In the illustrated exemplary embodiment, a light blocking member 220 is disposed in the lower display panel 100, but in an alternative exemplary embodiment, a light blocking member 220 may be in the upper display panel 200.

On the lower passivation layer 180p and light blocking member 220, a plurality of the color filter 230 is disposed. The color filter 230 may display any one of three primary colors such as red, green and blue, and may include an organic material that includes a pigment that displays any one of three primary colors.

The color filter 230 extends upward and downward from a region of the pixel in which two gate lines 121a and 121b are disposed, and overlaps the capacity voltage line 131, in the plan view. The color filter 230 is not disposed in a portion of a lower region of the pixel.

In the illustrated exemplary embodiment, a color filter 230 is disposed in the lower display panel 100, but in an alternative exemplary embodiment, a color filter 230 may be disposed in the upper display panel 200.

On the lower passivation layer 180p and a plurality of the color filter 230, an upper passivation layer 180q is disposed. The upper passivation layer 180q includes an organic insulator, and may include an organic material that has photosensitivity. The upper passivation layer 180q reduces or effectively prevents peeling of the color filter 230, suppresses contamination of the liquid crystal layer 3 by the organic material of the solvent that inflows from the color filter 230, and reduces or effectively prevents defects such as afterimages, that may occur when an image is displayed by the liquid crystal display.

In the upper passivation layer 180q and the lower passivation layer 180p, a plurality of contact holes 185a and 185b are respectively extended to exposure the first extended portion 177a of the first drain electrode 175a and the second extended portion 177b of the second drain electrode 175b. In the upper passivation layer 180q, the lower passivation layer 180p and gate insulating layer 140, a plurality of contact holes 185c that exposes a portion of the capacity electrode 137 are extended.

On the upper passivation layer 180q, a plurality of the pixel electrode 191 is disposed. Each pixel electrode 191 includes the first sub-pixel electrode 191a and the second sub-pixel electrode 191b that are separated from each other by the two gate lines 121a and 121b disposed therebetween. The first sub-pixel electrode 191a and the second sub-pixel electrode 191b are respectively disposed above and beneath a center of the pixel including the gate lines 121a and 121b, to be adjacent to each other in a column direction.

An overall shape of each sub-pixel electrode 191a and 191b is quadrangle. The first sub-pixel electrode 191a and the second sub-pixel electrode 191b each includes a transverse stem portion, and a vertical stem portion orthogonal to the transverse stem portion, and collectively forming a cross-shaped stem portion. Each sub-pixel electrode 191a and 191b is divided into four subregions by the stem portion, and each subregion includes a fine branched portion. An angle between the fine branched portion and the stem portion is about 45° or 135°, and the fine branched portions of two subregions that are adjacent to each other may be orthogonal to each other.

The first sub-pixel electrode 191a and the second sub-pixel electrode 191b are physically and electrically connected through the first contact hole 185a and the second contact hole 185b to the first drain electrode 175a and the second drain electrode 175b, and receive a data voltage from the first drain electrode 175a and the second drain electrode 175b. The first sub-pixel electrode 191a and the second sub-pixel electrode 191b to which the data voltage is applied, generates an electric field in conjunction with a common electrode 270 of the upper display (e.g., common electrode) panel 200, to determine a direction of the liquid crystal molecule of the liquid crystal layer 3 between two electrodes 191 and 270.

As described above, according to the determined direction of the liquid crystal molecule, the luminance of light that passes through the liquid crystal layer 3 is changed. A side or edge of the fine branched portion of the sub-pixel electrode distorts an electric field and makes a transverse component of the electric field that determines an inclination direction of the liquid crystal molecules 31. The transverse component of the electric field is substantially parallel to the side of the fine branched portion. Accordingly, the inclination direction of the liquid crystal molecule 31 are approximately four directions, and four domains in which the alignment directions of the liquid crystal molecules 31 are different from each other, are formed on the liquid crystal layer 3. As described above, by diversifying the inclination direction of the liquid crystal molecules, the standard viewing angle of the liquid crystal display is increased.

The second sub-pixel electrode 191b is physically and electrically connected through the contact hole 185b to the third source electrode 173c.

The capacity electrode 137 and an extended portion 177c of the third drain electrode 175c, overlap with the gate insulating layer 140 and semiconductor layers 157 and 167 therebetween, to form a voltage drop capacitor.

On the pixel electrode 191 and exposed upper passivation layer 180q, a lower alignment layer (not shown) is formed. The lower alignment layer may be a vertical alignment layer.

Next, the upper display panel 200 will be described.

The common electrode 270 is disposed on an insulation substrate 210. On the common electrode 270, an upper alignment layer (not shown) is disposed. The upper alignment layer may be a vertical alignment layer.

The liquid crystal layer 3 has a negative dielectric anisotropy, and the liquid crystal molecule 31 of the liquid crystal layer 3 may be aligned so that long axes thereof are vertical (e.g., perpendicular) with respect to the surface of two display panels 100 and 200, in a state in which there is no electric field.

If the gate-on voltage is applied to the first gate line 121a, the data voltage that is applied to the data line 171 is applied through the first drain electrode 175a and the second drain electrode 175b, to the first sub-pixel electrode 191a and the second sub-pixel electrode 191b. The data voltages that are applied to the first sub-pixel electrode 191a and the second sub-pixel electrode 191b are the same as each other. The first and the second liquid crystal capacitors Clca and Clcb are charged in the same value by a difference between the common voltage and the data voltage.

Thereafter, the voltage that is applied to the first gate signal line 121a is changed from the gate-on voltage to the gate-off voltage while the voltage that is applied to the second gate line 121b is changed from the gate-off voltage to the gate-on voltage, and charges are moved from the second sub-pixel electrode 191b through the third source electrode 173c to the third drain electrode 175c. Thereby, the charge voltage of the second liquid crystal capacitor Clcb is lowered and the voltage drop capacitor is charged. Since the charge voltage of the second liquid crystal capacitor Clcb is lowered by the capacitance of the voltage drop capacitor, the charge voltage of the second liquid crystal capacitor Clcb is lower than the charge voltage of the first liquid crystal capacitor Clca.

The charge voltages of two liquid crystal capacitors Clca and Clca show different gamma curves, and the gamma curve of one pixel voltage becomes a curved line that is obtained by synthesizing them. The synthesized gamma curve at a front (e.g., viewing side) side of a liquid crystal display is identical with the standard gamma curve at the front side, and the synthesized gamma curve at the lateral side is close to the standard gamma curve at the front side. By changing the image data as described above, the side visibility of a liquid crystal display is improved.

In addition, one pixel PX of the liquid crystal display according to the present exemplary embodiment is divided into two regions in which the intensities of the electric fields applied to the liquid crystal layer 3 are different from each other. Where there are two regions as describe above, a first region in which the intensity of the electric field applied to the liquid crystal layer 3 is relatively large and is occupied by the first sub-pixel electrode 191a. A second region in which the intensity of the electric field applied to the liquid crystal layer 3 is relatively small and is occupied by the second sub-pixel electrode 191b.

The color filter 230 is disposed only in the first region in which the intensity of electric field applied to the liquid crystal layer 3 is large, the first region including the first pixel electrode 191a, and in a portion of the second region in which the intensity of electric field that is applied to the liquid crystal layer 3 is small, the second region including the second pixel electrode 191b. The color filter 230 is not disposed in a remaining portion of the second region including the second pixel electrode 191b.

Referring to FIGS. 2, 9 and 10, a voltage charged to the liquid crystal layer in a first region of the pixel overlapping the second sub-pixel electrode 191b, is lower than a voltage charged to the liquid crystal layer in a second region of the pixel overlapping the first sub-pixel electrode 191a. The second region (191a) and a portion of the first region (191b) display a first color, and a remaining portion of the first region (191b) displays a second color.

It is preferable that a planar area of the remaining portion of the second region in which the color filter is not disposed is one half or less of the portion of the second region in which the color filter is. In addition, it is preferable that a planar area of the remaining portion of the second region in which the color filter 230 is not dispose is 20% or less of a total planar area of the pixel.

In the illustrated embodiment, by dividing one pixel into two regions in which the intensities of the electric fields applied to the liquid crystal layer 3 are different from each other, and not disposing the color filter 230 in a portion of the region in which the intensity of the electric field that is applied to the liquid crystal layer 3 is small, the color reproducibility is increased at a low grayscale, and the luminance is increased at a high grayscale that is a middle grayscale or more. Therefore, it is possible to increase the color reproducibility at a low grayscale and to increase the luminance at a high grayscale.

Many characteristics of the liquid crystal display according to the exemplary embodiments in FIGS. 6 and 7 may be applied to the liquid crystal display according to the exemplary embodiment in FIGS. 9 and 10.

Figure 11:
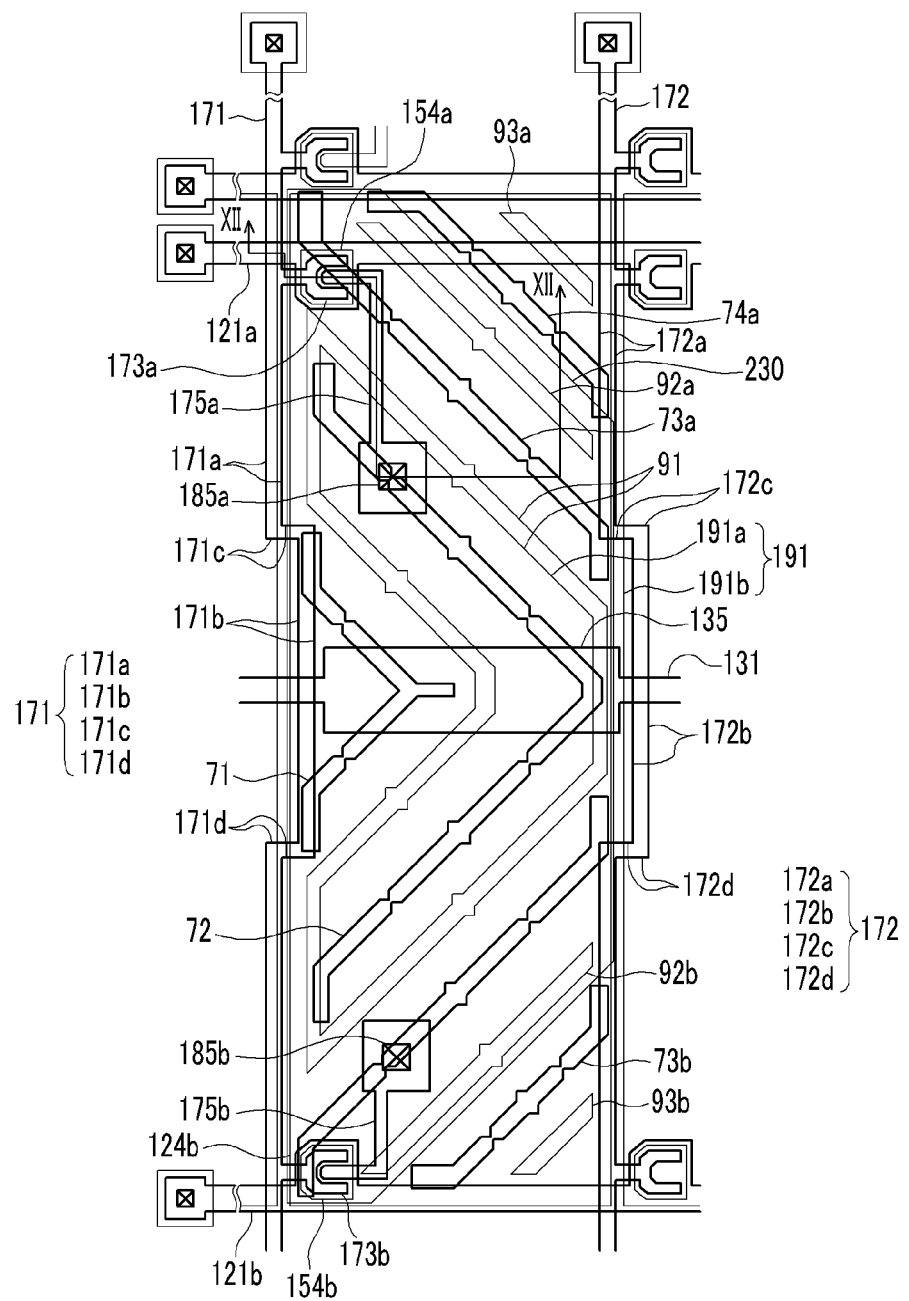
FIG. 11 is a plan view of another exemplary embodiment of a liquid crystal display, according to the invention.

Another example of the liquid crystal display that is shown in FIG. 8 will be described with reference to FIG. 11 and FIG. 12 in conjunction with FIG. 8. FIG. 11 is a plan view of another exemplary embodiment a liquid crystal display, according to the invention, and FIG. 12 is a cross-sectional view taken along line XII-XII of the liquid crystal display of FIG. 11.

Figure 12:
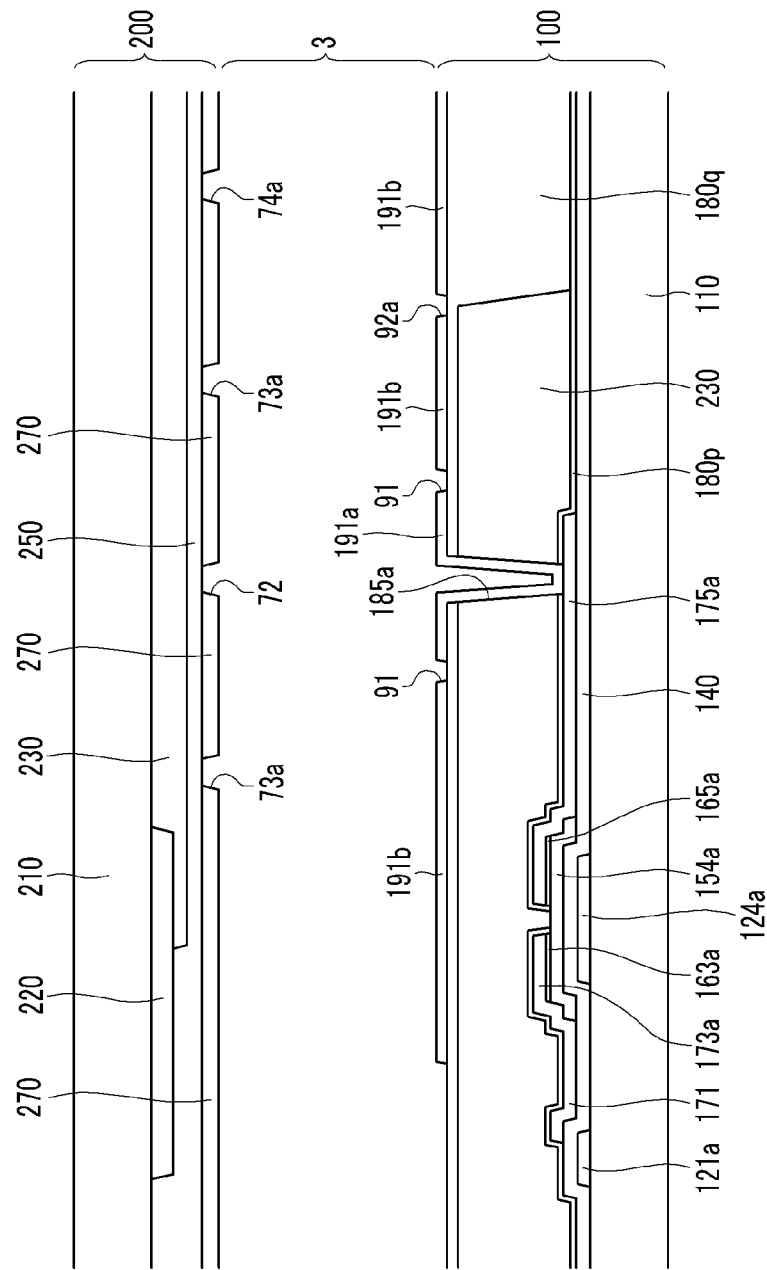
FIG. 12 is a cross-sectional view taken along line XII-XII of the liquid crystal display of FIG. 11.

With reference to FIG. 11 and FIG. 12, another exemplary embodiment of a liquid crystal display, according to the invention includes a lower display panel 100 and upper display panel 200 that face each other, and a liquid crystal layer 3 that is disposed between two display panels 100 and 200.

First, the lower display panel 100 will be described.

A plurality of first and second gate lines 121a and 121b, and a storage electrode line 131 are disposed on an insulation substrate 110. The first and second gate lines 121a and 121b include a plurality of first and second gate electrodes 124a and 124b, respectively. The storage electrode line 131 includes a transverse portion 135.

On the gate lines 121a and 121b and storage electrode line 131, a gate insulating layer 140 is disposed. On the gate insulating layer 140, a plurality of semiconductor islands 154a and 154b are disposed. On the semiconductors 154a and 154b, a plurality of ohmic contact islands 163a and 165a are formed.

On the gate insulating layer 140 and ohmic contact islands 163a and 165a, a plurality of a pair of data lines 171 and 172, and a plurality of a pair of first and second drain electrodes 175a and 175b are disposed. The data lines 171 and 172 are not entirely disposed on one straight line, and are bent at least two times within one pixel.

As shown in FIG. 11, the data lines 171 and 172 include a first vertical portion 171a and 172a that extend in a vertical direction, a first transverse portion 171c and 172c that are bent to the right from the first vertical portion 171a and 172a and extend in a transverse direction, a second vertical portion 171b and 172b that are bent downward from the first transverse portion 171c and 172c and extend in a vertical direction, and a second transverse portion 171d and 172d that are bent to the left from the second vertical portion 171b and 172b and extend in a transverse direction. The first vertical portion 171a and 172a and the second vertical portion 171b and 172b of two data lines 171 and 172 are parallel to each other and disposed on virtual straight lines that are separated from each other.

The data line 171 includes a plurality of first and second source electrode 173a and 173b that extend toward the gate electrode 124a and 124b. A portion of the semiconductor 154a and 154b is exposed between the first and second source electrode 173a and 173b, and the of first and second drain electrodes 175a and 175b, respectively.

On the data line 171 and 172, the first and second drain electrode 175a and 175b and the exposed portion of semiconductor 154a and 154b, a passivation layer is disposed. The passivation layer includes a lower passivation layer 180p including an inorganic insulator such as silicon nitride or silicon oxide, and an upper passivation layer 180q includes an organic insulator. It is preferable that the organic insulator of the upper passivation layer 180q has the dielectric constant of about 4.0 or less, and may have photosensitivity and provide a flat surface of the lower display panel 100. The passivation layer may have a single-layered structure in the cross-sectional view, which includes an inorganic insulator and/or organic insulator. In addition, it is preferable that the upper passivation layer 180q of the passivation layer has a thickness of 1.0 μm or more, in order to lower a coupling phenomenon between the pixel electrode 191 and the data line 172, and planarize the structure of the lower display panel 100.

In the passivation layer 180p and 180q, a plurality of contact holes 185a and 185b that expose the first and the second drain electrode 175a and 175b, are extended.

On the passivation layer 180p and 180q, a plurality of pixel electrodes 191 that include the first and the second sub-pixel electrode 191a and 191b, are disposed.

The first sub-pixel electrode 191a and the second sub-pixel electrode 191b are physically and electrically connected to the first and second drain electrodes 175a and 175b through the contact holes 185a and 185b, to receive the voltage from the first and second drain electrodes 175a and 175b. Different data voltages that are predetermined with respect to one input image signal are applied to a pair of sub-pixel electrodes 191a and 191b, and the size of the data voltages may be set according to the size and shape of the sub-pixel electrodes 191a and 191b.

Planar areas of the sub-pixel electrodes 191a and 191b may be different from each other. In one exemplary embodiment, for example, the first sub-pixel electrode 191a receives a high voltage as compared to the second sub-pixel electrode 191b, and has a smaller planar area than the second sub-pixel electrode 191b.

Vertical portions of the first sub-pixel electrode 191a are respectively disposed to be adjacent to the second vertical portion 172b of the data line 172, and adjacent to the first vertical portion 171a of the data line 171, each of the vertical portions of the data lines being bent outward corresponding to the vertical portions of the first sub-pixel electrode 191a. The vertical portions of the first sub-pixel electrode 191a are spaced at a predetermined interval from the first vertical portion 171a and the second vertical portion 172b of the data lines 171 and 172. That is, when the first sub-pixel electrodes 191a are projected on the same flat surface as the first data line 171 and the second data line 172, projection patterns of the first sub-pixel electrodes 191a and the first vertical portion 171a and the second vertical portion 172b of the data lines 171 and 172 are spaced from each other. Accordingly, since the first sub-pixel electrode 191a does not overlap the data lines 171 and 172, and is spaced from the data line 171 and 172, a coupling phenomenon between the first sub-pixel electrode 191a and the data line 171 and 172 is lowered, so that cross talk defects that occur by the coupling between the first sub-pixel electrode 191a and the data line 171 and 172 are reduced or effectively prevented.

The second sub-pixel electrode 191b overlaps the second vertical portion 171b of the data line 171, and overlaps the first vertical portion 172a of the data line 172 that is adjacent to the data line 171. The second sub-pixel electrode 191b has a width taken in the transverse direction of the pixel to overlap the second vertical portion 171b of the data line 171 and the first vertical portion 172b of the adjacent data line 172, thereby increasing an aperture ratio of the liquid crystal display.

It is preferable that a planar area in which the second sub-pixel electrode 191b overlaps the data line 171 and drain electrode 175b, and a planar area in which the second sub-pixel electrode 191b overlaps the first vertical portion 172a of the adjacent data line 172, are in a ratio of about 0.8:1 to about 1.2:1. By controlling the ratio of areas in which the second sub-pixel electrode 191b overlaps the adjacent data lines 171 and 172 at the left and right sides of the pixel, a difference between sizes of parasitic capacity formed by the second sub-pixel electrode 191b and the adjacent data lines 171 and 172 at the left and right sides is lowered, so that cross-talk defects that occur by a parasitic capacity deviation between the second sub-pixel electrode 191b and the data line 171 and 172 that are adjacent, can be reduced or prevented.

Next, the upper display panel 200 will be described.

On an insulation substrate 210, a light blocking member 220, a color filter 230, an overcoat 250 and a common electrode 270 are sequentially disposed.

In the illustrated exemplary embodiment, the light blocking member 220 and the color filter 230 are in the upper display panel 200, but in an alternative exemplary embodiment, the light blocking member 220 and the color filter 230 may be in the lower display panel 100.

The color filter 230 is disposed on a region that includes the first sub-pixel electrode 191a, and on a portion of a region that includes the second sub-pixel electrode 191b. The color filter 230 is not disposed in a remaining portion of the region that includes the second sub-pixel electrode 191b. It is preferable that a planar area of the remaining portion of the region including the second sub-pixel electrode 191b where the color filter 230 is not disposed, is one half or less of a planar area of the portion of the region including the second pixel electrode 191b where the color filter is disposed. In addition, it is preferable that a planar area of the remaining portion of the region including the second sub-pixel electrode 191b where the color filter 230 is not disposed, is 20% or less of a total planar area of the pixel.

By dividing one pixel into two regions in which the intensities of the electric fields that are applied to the liquid crystal layer 3 are different from each other, and not disposing the color filter 230 in a portion of the region in which the intensity of the electric field that is applied to the liquid crystal layer 3 is small, the color reproducibility is increased at a low grayscale, and the luminance is increased at a high grayscale that is a middle grayscale or more. Therefore, it is possible to increase the color reproducibility at a low grayscale and to increase the luminance at a high grayscale.

An alignment layer (not shown) is coated on the inner surface of the display panels 100 and 200, and may be a vertical alignment layer.

A polarizer (not shown) may be provided on each of an outer surface of the display panels 100 and 200, and it is preferable that transmissive axes of two polarizers may be orthogonal to each other, and any one transmissive axis of them is parallel to the gate line 121.

The liquid crystal layer 3 has a negative dielectric anisotropy, and the liquid crystal molecule of the liquid crystal layer 3 may be aligned so that long axes thereof are vertical with respect to the surface of two display panels 100 and 200 in a state in which there is no electric field. Therefore, the incident light does not pass through the crossed polarizers but is blocked.

Oblique sides of cutouts 92a, 92b, 93a, and 93b of the pixel electrode 191, oblique sides of cutouts 71 to 74b of the common electrode, and oblique sides 91 (or edges) of the pixel electrode 191 that are parallel to the cutouts distort an electric field applied between the pixel electrode 191 and the common electrode 270, to generate a transverse component that determines the inclination direction of the liquid crystal molecules. A transverse component of the electric field is vertical (e.g., perpendicular) to the oblique sides of the cutouts 92a to 93b, oblique sides of the cutouts 71 to 74b and the oblique side 91 of the pixel electrode 191. As described above, by diversifying the inclination direction of the liquid crystal molecules, the standard viewing angle of the liquid crystal display is increased.

At least one of the cutouts 92a to 93b, and/or of the cutouts 71 to 74b in the plan view, may be substituted by a protrusion or a recess portion in the cross-section view, and the shape and arrangement of the cutouts 92a to 93b, and the cutouts 71 to 74b may be modified.

Many characteristics of the liquid crystal display according to the exemplary embodiments in FIGS. 6-10 may be applied to the liquid crystal display according to the exemplary embodiment in FIGS. 11 and 12.

Figure 13:
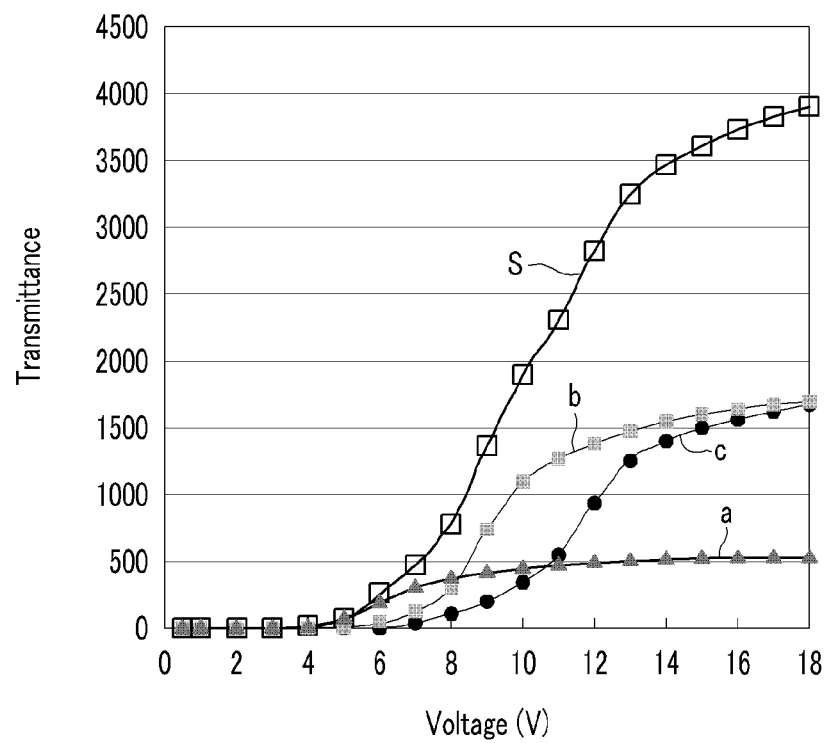
FIG. 13 is a graph that illustrates a voltage-transmittance a curved line, according to an Experimental Example of the invention.

Next, with reference to FIG. 13, the transmittance of the liquid crystal display according to an Experimental Example of the invention will be described. FIG. 13 is a graph that illustrates a voltage-transmittance with curved lines according to an Experimental Example of the present invention.

In the Experimental Example, representing the exemplary embodiment that is shown in FIG. 6, one pixel PX is divided into three regions HA, MA, and LA in which the intensities of the electric fields that are applied to the liquid crystal layer 3 are different from each other. A ratio of a planar area of the first region HA, a planar area of the second region MA, and a planar area of the third region LA is about 1:3:1, and the voltage-transmittance curved line in each region and the voltage-transmittance curved line in the entire pixel are shown in FIG. 13.

With reference to FIG. 13, referring to the voltage-transmittance curved line (c) (e.g., --●--) of the third region LA, it can be seen that the transmittance is very small at a low voltage, and the transmittance is largely increased from the middle voltage or more. In addition, with reference to the voltage-transmittance curved line (a) (e.g. --▲--) of the first region HA and the voltage-transmittance a curved line (b) (e.g. --■--) of the second region MA, it can be seen that the transmittance is higher at a low voltage than that of the third region LA. Therefore, as shown in the voltage-transmittance curved line (S) (e.g. --□--) of the entire pixel area, it can be seen that while the color reproducibility is increased at a low grayscale, the luminance is increased at a high grayscale.

In detail, in the exemplary embodiment of the invention with respect to FIG. 6, the color filter is disposed only in the first region HA and the second region MA in which the intensity of electric field that is applied to the liquid crystal layer 3 is relatively large, and the color filter is not disposed in the third region LA in which the intensity of electric field that is applied to the liquid crystal layer 3 is relatively small. Consequently, at a low grayscale, since the transmittance of light that passes through the color filter by the effect of the first region HA and the second region MA is high, the color reproducibility is increased, and at a high grayscale that is a middle grayscale or more, the transmittance is increased in the first region HA, the second region MA and the third region LA. In particular, the transmittance of the third region LA from which the color filter is not disposed is increased, thereby increasing the entire luminance. Therefore, it is possible to increase the color reproducibility at a low grayscale and to increase the luminance at a high grayscale.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate and a second substrate facing each other;
a signal line disposed on the first substrate;
a thin film transistor connected to the signal line; and
a pixel electrode connected to the thin film transistor in a pixel area and including a first pixel electrode and a second pixel electrode, the first pixel electrode and the second pixel electrode being separated from each other,
wherein
each of the first pixel electrode and the second pixel electrode includes a plurality of a branched electrodes, and
the pixel area includes:
a first region comprising alternating branched electrodes of the first and second pixel electrodes, in which an interval between adjacent branched electrodes is a first distance, and
a second region comprising alternating branched electrodes of the first and second pixel electrodes, in which an interval between adjacent branched electrodes is a second distance smaller than the first distance,
wherein the second region and a first portion of the first region display a first color, and a second portion of the first region different from the first portion, displays a second color.

2. The liquid crystal display of claim 1, wherein:
the first color is any one of primary colors, and
the second color is white or yellow.

3. The liquid crystal display of claim 2, wherein:
in the second region and the first portion of the first region displaying the first color, a color filter is disposed, and
in the second portion of the first region displaying the second color, the color filter is not disposed.

4. The liquid crystal display of claim 3, wherein:
the color filter is disposed on the first substrate.

5. The liquid crystal display of claim 4, wherein:
the color filter is disposed between the signal line and the pixel electrode, and
in the second portion of the first region displaying the second color, a transparent organic insulator is disposed.

6. The liquid crystal display of claim 3, wherein:
the color filter is disposed on the second substrate.

7. The liquid crystal display of claim 3, wherein:
a planar area of the second portion of the first region displaying the second color is 20% or less of a total planar area of the first pixel electrode and the second pixel electrode.

8. The liquid crystal display of claim 3, wherein:
a planar area of the second portion of the first region displaying the second color, is one half or less of a planar area of the first portion of the first region displaying the first color.

9. The liquid crystal display of claim 1, wherein:
a planar area of the second portion of the first region displaying the second color is 20% or less of a total planar area of the first pixel electrode and the second pixel electrode.

10. The liquid crystal display of claim 1, wherein:
a planar area of the second portion of the first region displaying the second color, is one half or less of a planar area of the first portion of the first region displaying the first color.

11. The liquid crystal display of claim 1, further comprising:
a liquid crystal layer between the first substrate and the second substrate,
wherein long axes of liquid crystal molecules of the liquid crystal layer are perpendicular to planar surfaces of the first substrate and the second substrate, in a state in which there is no electric field.

12. The liquid crystal display of claim 1, wherein:
the first region further includes a third region in which an interval between adjacent branched electrodes of the first pixel electrode and the branched electrodes of the second pixel electrode is a third distance larger than the first distance,
the second portion of the first region displaying the second color is the third region.

13. The liquid crystal display of claim 12, wherein:
a planar area of the third region is the same as or smaller than a planar area of the second region, and
a planar area of the first portion of the first region in which the interval between adjacent branched electrodes of the first pixel electrode and the branched electrodes of the second pixel electrode is the first distance, is three times or more the planar area of the third region.

14. The liquid crystal display of claim 13, wherein:
the first color is any one of primary colors, and
the second color is white or yellow.

15. The liquid crystal display of claim 14, wherein:
in the second region and the first portion of the first region displaying the first color, a color filter is disposed, and
in the second portion of the first region displaying the second color, the color filter is not disposed.

16. The liquid crystal display of claim 15, wherein:
the color filter is disposed on the first substrate.

17. The liquid crystal display of claim 16, wherein:
the color filter is disposed between the signal line and the pixel electrode, and
in the second portion of the first region displaying the second color, a transparent organic insulator is disposed.

18. The liquid crystal display of claim 15, wherein:
the color filter is disposed on the second substrate.

19. The liquid crystal display of claim 12, wherein:
a planar area of the third region is 20% or less of a total planar area of the first pixel electrode and the second pixel electrode.

20. The liquid crystal display of claim 12, further comprising:
a liquid crystal layer disposed between the first substrate and the second substrate,
wherein long axes of the liquid crystal molecules of the liquid crystal layer are perpendicular to the planar surfaces of the first substrate and the second substrate, in a state in which there is no electric field.

21. A liquid crystal display, comprising:
a first substrate and a second substrate facing each other;
a signal line disposed on the first substrate;
a thin film transistor connected to the signal line;
a pixel electrode connected to the thin film transistor in a pixel area and including a first sub-pixel electrode and a second sub-pixel electrode, the first sub-pixel electrode and the second sub-pixel electrode being separated from each other; and
a liquid crystal layer between the first substrate and the second substrate, and including a liquid crystal molecule,
wherein
the pixel area includes a first region corresponding to the first sub-pixel electrode and a second region corresponding to the second sub-pixel electrode,
a first voltage applied to the first sub-pixel electrode is different from a second voltage appplied to the second sub-pixel electrode, and
the second region and a portion of the first region display a first color, and a remaining portion of the first region displays a second color.

22. The liquid crystal display of claim 21, wherein:
the first color is any one of primary colors, and the second color is white or yellow.

23. The liquid crystal display of claim 22, wherein:
in the second region and the portion of the first region displaying the first color, a color filter is disposed, and
in the remaining portion of the first region displaying the second color, the color filter is not disposed.

24. The liquid crystal display of claim 23, wherein:
the color filter is disposed on the first substrate.

25. The liquid crystal display of claim 24, wherein:
the color filter is disposed between the signal line and the pixel electrode, and
in the remaining portion of the first region displaying the second color, a transparent organic insulator is disposed.

26. The liquid crystal display of claim 23, wherein:
the color filter is disposed on the second substrate.

27. The liquid crystal display of claim 23, wherein:
a planar area of the remaining portion of the first region displaying the second color is 20% or less of a total planar area of the first sub-pixel electrode and the second sub-pixel electrode.

28. The liquid crystal display of claim 23, wherein:
a planar area of the remaining portion of the first region displaying the second color is one half or less of a planar area of the portion of the first region displaying the first color.

29. The liquid crystal display of claim 21, wherein:
a planar area of the remaining portion of the first region displaying the second color is 20% or less of a total planar area of the first sub-pixel electrode and the second pixel sub-electro de.

30. The liquid crystal display of claim 21, wherein:
a planar area of the remaining portion of the first region displaying the second color is one half or less of a planar area of the portion of the first region displaying the first color.

31. The liquid crystal display of claim 21, wherein:
long axes of the liquid crystal molecules of the liquid crystal layer are perpendicular to planar surfaces of the first substrate and the second substrate, in a state in which there is no electric field.

* * * * *